Oct. 10, 1933.  T. R. GOLDSBOROUGH  1,929,668

INDICATING DEVICE

Filed April 2, 1932

INVENTOR:
Thaddeus R. Goldsborough

Patented Oct. 10, 1933

1,929,668

UNITED STATES PATENT OFFICE 1,929,668

INDICATING DEVICE

Thaddeus R. Goldsborough, Merchantville, N. J., assignor to Radio Corporation of America, a corporation of Delaware Application April 2, 1932. Serial No. 602,698

15 Claims. (Cl. 116—124.4)

My invention relates to indicating devices and, more particularly, to devices of the type adapted to indicate the tuning of radio receivers and the like.

More specifically stated, my invention is in the nature of a modification of and an improvement over the invention disclosed in the copending application of Arthur G. D. West, Serial No. 476,922, filed August 21, 1930, and assigned to Radio Corporation of America. In the said application, it is shown that lights of complementary colors may be utilized in connection with dial-scales printed in ink of the same colors to indicate which, of several possible frequency ranges, a radio receiver is in condition to cover, the scale corresponding to another frequency range being substantially invisible.

In a device constructed according to the West application, all of the indicia on the scale momentarily in use are visible simultaneously. The device, therefore, while quite advantageous from the standpoint of convenience, has substantially no novelty or eye-appeal as compared to completely illuminated dial-scales already in use.

It is, accordingly, an object of my invention to provide an indicating device that, in addition to its mechanical advantages, shall have novel features enhancing its commercial value.

Another object of my invention is to provide an indicating device wherein all of the major portion of an indicia carrying element shall be illuminated, yet wherein the indicia per se shall be momentarily visible only over a restricted portion of the said element.

The foregoing objects and additional objects ancillary thereto I prefer, in brief, to accomplish as follows: I provide an element, translucent or opaque, whereon indicia are printed in a color other than black, together with illuminating means therefor. In addition, I provide a translucent masking element, approximating in contour the indicia-carrying element, or dial scale, the major portion of the said masking element being of the same color as the indicia and a minor portion thereof, or window, being of a substantially complementary color.

The dial scale and the masking element are mounted for movement relative to each other during the adjusting operation and they are both so disposed with respect to the illuminating means that light reflected from the scale or passing therethrough is modified by the said masking means before it reaches the eye of an observer. Such being the case, it is apparent that the indicia per se are visible only when light colored thereby is further modified by the window portion of the masking element and are invisible otherwise.

The effect upon the eye of the observer, therefore, is that the indicia, so to speak, float into and out of the window and disappear on each side thereof.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, wherein Fig. 1 is a perspective view of an indicating device including a preferred embodiment of my invention, a portion of the panel being broken away to more clearly show the construction.

Figure 1:
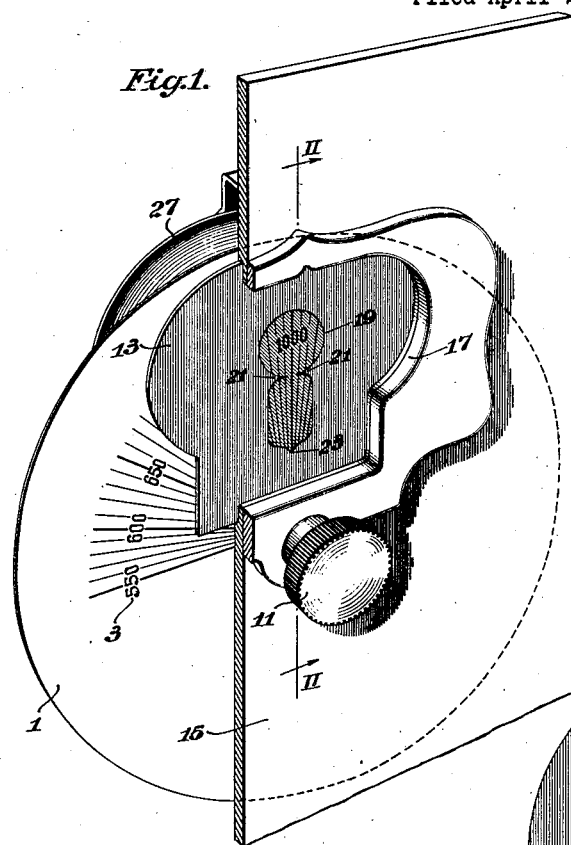
Figure 2:
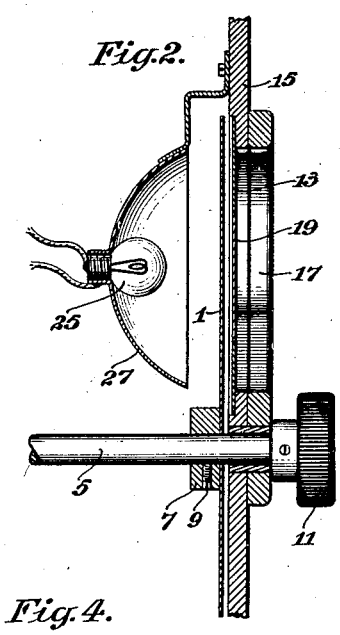
Fig. 2 is a view in cross section of the device taken on a line corresponding to the line II—II in Fig. 1.

Referring specifically to Figs. 1 and 2, an indicating device constructed according to my invention preferably includes a translucent dial scale 1, preferably circular or semi-circular, on which colored indicia 3 corresponding to any desired adjustment of the apparatus are printed. The dial scale is firmly affixed to a shaft 5, which carries an adjustable element of the apparatus (not shown), as by a hub element 7, and a set screw 9. The shaft may be directly turned through an adjusting knob 11 or reducing gear of any desired type (not shown) may be interposed between the knob and the shaft. A translucent masking device 13, the major portion of which is colored substantially the same as the indicia is disposed in front of the rotatable dial scale and is supported by a panel 15 behind an escutcheon opening 17 of any desired shape.

The masking device is provided with a central translucent minor area 19, the color of which is complementary to the color of the major area for a purpose that will hereinafter appear. The boundary of the minor area is provided with oppositely disposed closely adjacent portions 21 that have fiduciary functions.

At least one portion of the boundary of the minor area may be provided with such configuration as to provide an additional fiduciary mark 23 if desired.

A light source 25 is disposed behind the rotatable dial scale and, preferably the said source is provided with a reflector 27 of such contour that all of the masking device visible through the escutcheon opening receives even illumination.

In the operation of the adjusting device as shown in Figs. 1 and 2, the rotation of the shaft causes movement of the dial scale. Light from the source, passing through the dial scale, falls upon the masking device to illuminate it. Light passing through that portion of the scale immediately behind the minor area causes the markings on the said scale to become visible therethrough. At each side of the minor area, however, the masking device functions to render the scale markings invisible. The effect, therefore, upon the eye of the observer is that the scale markings "swim" into view out of invisibility and become invisible upon continued rotation of the shaft. In other words, the observer sees a completely illuminated area through the escutcheon plate opening, but the indicia upon the scale are visible only in the minor central area.

It will also be noted that adjustment is facilitated by causing the radial lines associated with the indicia, which lines are preferably, though not necessarily, printed the same color as the said indicia, to bisect the space between the opposite inwardly extending portions of the minor area, while, at the same time, the lower end of the line coincides with the central portion of the minor-area boundary which has such configuration as to provide an additional fiduciary mark.

It is, of course, to be understood that the lower fiduciary mark may be omitted and that the general contour of the minor area may be changed in a wide variety of ways. It is desirable, however, to give the boundary of the said minor area such configuration that the radial line associated with the number on the scale corresponding to each momentary adjustment of the device at all times is visible.

For purposes of convenience, since red translucent ink is commercially available, I prefer to print the indicia and radial lines in that color and to color the major area of the masking device or color screen red. In such event the central minor area will naturally be green or a color effectively complementary to red. However, it lies within the scope of my invention to utilize any two complementary colors for the printing and the minor area and to color the major area of the masking device accordingly. For example, since green is more pleasing to some eyes than red, the major area might well be colored green and only the central minor area colored red.

Since, according to my invention, it is only necessary that relative motion between the dial scale and the masking device be had during adjustment of the apparatus, it is obvious that the said scale and mask may be rectangular in shape and means may be provided whereby rectilinear relative movement therebetween is given.

Furthermore, it lies within the spirit of my invention to maintain the dial scale stationary and to rotate the masking device between it and the eye of the observer. The latter modification is illustrated in Figs. 3, 4 and 5 of the drawing, wherein elements corresponding to those shown in Figs. 1 and 3 are similarly designated.

Figure 4:
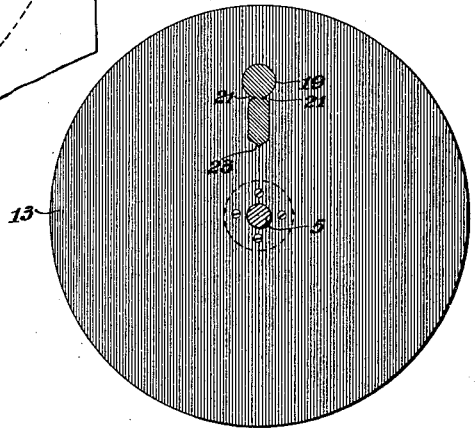
Fig. 4 is a detailed view of a masking device or color screen as used in the modification shown in Fig. 3.
Figure 3:
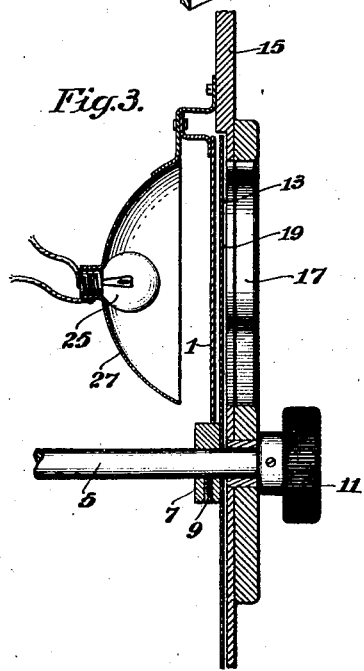
Fig. 3 is a cross-sectional view of a modified form of indicating device embodying my invention.
Figure 5:
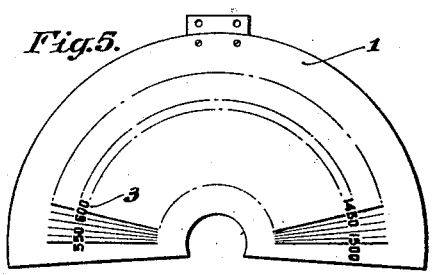
Fig. 5 is a view of an indicating element such as is used in the device shown in Fig. 3.

From an inspection of Figs. 3 and 4 it will be noted that the minor area of the masking device rotates in an arc in front of the dial scale, thus giving the effect of rendering the indicia momentarily visible during rotation. Except for the movement of the said minor portion, the operation of the device illustrated in Figs. 3, 4 and 5 is essentially the same as that shown in Fig. 1.

It will be apparent from a consideration of the foregoing that my improved indicating device offers advantages not obtainable with analogous devices of the prior art. For example, the somewhat diffused illumination of the complete escutcheon opening is quite pleasing to the eye, while, at the same time, the appearance and disappearance of the indicia corresponding to adjustments of the apparatus introduces a novel and unusual effect.

My improved adjusting device is also advantageous in that the radial lines on the dial scale, corresponding to desired adjustments, are not obscured by a shadow line, a pointer, or the like.

Although I have shown and described a few specific embodiments of my invention, many variations thereof will at once be apparent to those skilled in the art to which it pertains. My invention, therefore, is not to be restricted except insofar as is necessitated by the prior art and by the spirit of the appended claims.

What I claim is:

1. An indicating device including a scale having colored indicia thereon, means for illuminating a portion thereof and means including a translucent screen, a portion of which is of a color complementary to the color of the indicia, for rendering said indicia visible over a restricted area of said illuminated portion.

2. The invention set forth in claim 1 characterized in that the indicia are of a color other than black.

3. The invention set forth in claim 1 characterized in that the means for giving visibility to the indicia has a color effectively complementary to the color of the indicia.

4. An indicating device including a scale carrying colored indicia, means for illuminating the scale, and masking means for modifying light from said scale, a minor portion of said masking means being of a color effectively complementary to the color of said indicia.

5. The invention set forth in claim 4 further characterized in that the major portion of said masking means is of a color substantially the same as that of the indicia.

6. An indicating device including a scale carrying colored indicia, means for illuminating the scale, masking means for also modifying light modified by the scale, and means for causing relative movement between said scale and said masking means, a minor portion of said masking means being of a color effectively complementary to the color of said indicia and the major portion thereof being of a color substantially the same as that of the indicia.

7. A color-screen, for use in indicating devices, comprising a major translucent area of one color and a minor translucent area of a substantially complementary color.

8. The invention set forth in claim 7 characterized in that the boundary of the minor area is provided with oppositely disposed, closely adjacent portions that have fiduciary functions.

9. The invention set forth in claim 7 characterized in that at least one portion of the boundary of the minor area is of such configuration as to provide a fiduciary mark.

10. The method of indicating the adjustment of a device provided with an indicating scale which comprises illuminating the scale while exposing the major area thereof to view, rendering substantially invisible the indicia on said major area, rendering visible the indicia on a minor area of the scale, and causing relative movement between the area of visibility and the scale per se during adjustment of the device.

11. An indicating device including a scale having colored indicia thereon, means for illuminating a portion thereof, means including a translucent screen, a portion of which is of a color complementary to the color of the indicia, for rendering said indicia visible over a restricted area of said illuminated portion, and means defining an area of said screen greater than and including said restricted area.

12. An indicating device including a scale carrying colored indicia, means for illuminating the scale, masking means for modifying light from said scale, a minor portion of said masking means being of a color effectively complementary to the color of said indicia, a major portion of the masking means being of a color substantially the same as that of the indicia, and means defining an area of the masking means including both the minor and at least a portion of the major areas thereof.

13. An indicating device including in combination, two translucent plates relatively movable in close parallel relation to each other providing a dial member and masking means therefor, means for rendering visible and defining a predetermined area of the plate providing the masking means, means for illuminating said area through the plate providing the dial member, said dial member being provided with colored indicia, and a minor portion of the visible area of the plate providing the masking means being of a color effectively complementary to the color of said indicia.

14. In an indicating device, means providing a scale having colored indicia thereon, and means for selecting and rendering visible a portion of said scale, said means including a translucent mask having a window complementary in color to the color of the indicia, said first named means and said masking means being relatively movable in parallel relation to each other.

15. In an indicating device, means providing a scale having colored indicia thereon, and means for selecting and rendering visible a portion of said scale, said means including a translucent mask having a window complementary in color to the color of the indicia, said first named means and said masking means being relatively movable.

THADDEUS R. GOLDSBOROUGH.